US007076434B1

(12) United States Patent
Newnam et al.

(10) Patent No.: US 7,076,434 B1
(45) Date of Patent: Jul. 11, 2006

(54) METHOD AND SYSTEM OF PLAYING AND CONTROLLING A CONTEST FOR A LARGE NUMBER OF SIMULTANEOUS CONTESTANTS

(75) Inventors: Jennifer Newnam, Boston, MA (US); Scott Newnam, Boston, MA (US); Izet Fraanje, Boston, MA (US)

(73) Assignee: Goldpocket Interactive, Inc., Los Angeles, CA (US)

( * ) Notice: Subject to any disclaimer, the term of this patent is extended or adjusted under 35 U.S.C. 154(b) by 529 days.

(21) Appl. No.: 09/536,518

(22) Filed: Mar. 22, 2000

(51) Int. Cl.
*G06F 17/60* (2006.01)

(52) U.S. Cl. ............................... 705/1; 705/10; 705/14; 463/7; 463/9

(58) Field of Classification Search .................... 705/1, 705/10, 14; 463/7, 9
See application file for complete search history.

(56) References Cited

U.S. PATENT DOCUMENTS

| | | | |
|---|---|---|---|
| 5,589,892 A | 12/1996 | Knee et al. | 348/731 |
| 5,774,664 A | 6/1998 | Hidary et al. | 395/200.48 |
| 5,778,181 A | 7/1998 | Hidary et al. | 395/200.48 |
| 5,964,660 A * | 10/1999 | James et al. | 463/1 |
| 6,018,768 A | 1/2000 | Ullman et al. | 709/218 |
| 6,106,399 A * | 8/2000 | Baker et al. | 463/42 |
| 6,215,526 B1 | 4/2001 | Barton et al. | 348/473 |
| 6,233,389 B1 | 5/2001 | Barton et al. | 386/46 |
| 6,304,902 B1 * | 10/2001 | Black et al. | 709/223 |

FOREIGN PATENT DOCUMENTS

| | | |
|---|---|---|
| WO | WO 97/34419 | 9/1997 |
| WO | WO 98/28916 | 7/1998 |
| WO | WO 01/39506 | 5/2001 |

OTHER PUBLICATIONS

Dialog reference. file 810, # 0677100. "NetPlay: NetPlay debuts Internet Premier Multi-Player Entertainment Network; NetPlay Game Club Brings People Together To Create Broad-Based, Online Community". Business Wire, Mar. 3, 1997.*

Dialog reference. File 9 # 01839448. "Have a joystick, will Surf", Discount Store News, v 36, n 9, p. 25, Mar. 5, 1997.*

(Continued)

*Primary Examiner*—Raquel Alvarez
(74) *Attorney, Agent, or Firm*—Wilmer Cutler Pickering Hale and Dorr

(57) ABSTRACT

A method of using a communication network so that a large multitude of users may simultaneously compete in a skill-based contest includes identifying a large multitude of contestants; grouping the contestants into subsets according to group criteria; and matching contestants within the subsets into subcompetitions. The method also includes, for each subcompetition, presenting a competition task over the communications network to the contestants of the subcompetition; monitoring responses to the competition task from each subcompetition; and determining a subcompetition status of each contestant in the subcompetition; and grouping at least some of the contestants according to at least one of the group criteria or subcompetition status. One or more steps are repeated until there is a unique winner of the contest. The contest begins for all contestants at a fixed start time and converges to the unique winner in a fixed, short amount of time after the start time.

18 Claims, 11 Drawing Sheets

OTHER PUBLICATIONS

Dialog reference . File 636, # 03438376, "Software: Broderbund Partners with NetPlay", dot.com, v3, n11, pN/A, Feb. 1, 1997.*

ABC Sports, "ABC Sports To Launch Enhanced TV Programming During Jan. 4 Tostitos Fiesta Bowl College Football National Championship Game" *Press Release* (1998).

CNET News, "Companies Want To Raise Boob Tube's IQ" *Article* (1996).

Steeplechase Media, Inc., "Steeplechase Media Develops Enhanced TV The Documentary Channel" *Press Release* (1998).

Intel, "MTV and Intel Create New Interactive Experience For Music Fans" *Article* (1997).

Intel, "Intel and PBS To Air First Nationwide Enhanced Digital TV Broadcast" *Article* (1998).

* cited by examiner

METHOD AND SYSTEM OF PLAYING AND CONTROLLING A CONTEST FOR A LARGE NUMBER OF SIMULTANEOUS CONTESTANTS

BACKGROUND OF THE INVENTION

1. Field of the Invention

The method and apparatus of the present invention relate to electronic skill-based competitions using electronic networks.

2. Discussion of Related Art

There are dozens of skill-based competitions in use today. Most of these competitions can be placed in one of two categories. The first category includes the many board games, card games and other games of skill that millions of people play everyday in one-on-one and small group competitions. The second category provides entertainment to large audiences who passively watch a small randomly selected group compete in a game broadcast on television.

Competitors in the first group of games usually do not have the opportunity for large financial rewards or recognition for success beyond the small group of individuals they are competing against.

Almost all of the skill-based competitions that reward winners fall into the second category and are available to only a small percentage of the population at large. Game shows such as The Jeopardy! game show have only a handful of contestants per night. However, these types of game shows receive hundreds of thousands of inquiries from potential contestants per week. Because of the limit on the number of contestants, potential contestants must go through an onerous and very time-costly process to have a chance to be randomly selected to compete in one of the skill-based competitions.

Most skill-based competitions with rewards are broadcast on television for the public to enjoy. The entertainment provided by these games is primarily that viewers can live vicariously through the wins and losses of the few select players. Passive viewers often attempt to increase the entertaining benefit by mentally simulating competition against the real competitors. Most viewers will almost never have an opportunity to compete in the skill-based games, primarily because of the time and effort required to simply have a chance at being selected. Almost no skill-based competition of significant size allows viewers at home to compete for substantial prizes, etc. Likewise, none of the games people play at home provide similar financial rewards and recognition.

As an example of the limitations on the ability of a person to participate in a television game show, the following paragraphs use the Jeopardy! game show to describe the process of becoming a contestant on a major skill-based competition which rewards winners. It illustrates the time-consumption and demands on potential contestants and on the randomness of selecting contestants.

With regard to The Jeopardy! game show, to obtain a chance to compete for a reward, an individual must attempt to schedule an appointment and then travel to Culver City, Calif. to enter the formal process. The potential contestant must then take a written test while in Culver City. The tests are advertised as being extremely difficult and thus The Jeopardy! game show encourages individuals not to come to California for the sole purpose of trying out for the show. Additionally, tests are not conducted over the phone or over the Internet. The two basic steps to qualify as a contestant on The Jeopardy! game show are 1) taking a 50 question test, and for those that pass the test, 2) playing of a mock game. The test is videotaped by the show host and covers a wide range of categories.

Potential contestants are asked to dress as they would to appear on the show. If an individual passes the test and plays well in the mock game, he or she is put in an "active file" for the current tape year. Being put in the active pool does not guarantee that an individual will be invited to appear on the show. Contestants are then selected from the active pool to appear on the show. The specific selection process used to determine who moves from the active pool to true contestant is not made public.

While all skill-based competitions with rewards do not follow the same rules, almost all are similar in that (1) they require an extremely onerous and time-consuming process to reach the contestant level, (2) they include a large element of chance and/or subjectivity in the selection of contestants and (3) they limit the number of participants to a very small fraction of the total applicants. The time onerous nature and time-consumption is hugely inefficient since it prohibits a large portion of the population from actually participating in the contests. Further, the random nature of the selection discourages many potential contestants from attempting to become a participant. The two inefficiencies combined relegate the average person to participating vicariously by watching taped versions of games played days in advance.

In addition to traditional game shows, multi-player video-based games exist. Multi-player video-based games such as UltimaOnline (.UltimalOnline.com) allow multiple people to engage in an electronic game at one time. This provides additional value to consumers who would like to participate in a game with multiple people. Additionally, becoming a participant in the game takes little time since it can be accessed from a connection to the Internet. However, participants must pay to play the game. Further, these games do not satisfy the general requirements of competitive skill-based games such as game shows which have (1) a winner and (2) a defined start and end time. These games are ongoing interactions that allow participants to take turns in order to simulate interactions though they are not actually playing simultaneously.

A number of games have arisen on the Internet that simulate game shows broadcast over television. For instance, Sony has a number of games that can be played over the Internet which simulate traditional game shows. Jeopardy! Online or Trivial Pursuit Online (.station.sony-.com) are Internet games that allow multiple players to come together to simulate the traditional versions of these games. This allows individuals who would like to feel the competitive nature of these games to enjoy them online. However, four key elements are missing from the value proposition: (1) the games simply pool a limited number of individuals into a simulated game as the players arrive at the site and (thus, one cannot really compete against the larger public), (2) the games are simulations, not a live event, (3) do not award the significant prizes available offline in a truly competitive game, (4) do not have an appropriate selection mechanism that allows the determination of a single winner from a large pool of contestants in "head-to-head" competition.

Other games exist which allow large numbers of individuals to compete for cash rewards, but they are mostly classified as gambling and thus are illegal in most states and require contestants to pay a fee to play the contest. None of the current skill-based games listed above have the synchronous, real-time nature and enable a scale of millions to play in a finite period of time.

SUMMARY

Preferred embodiments include a method and system of using an electronic network so that multiple users can compete in a skill-based contest. Contestants are identified. The set of contestants are grouped into group subsets according to group criteria. The contestants are matched within a group subset into subcompetitions. For each subcompetition, a competition task is electronically presented. Responses to the competition task are monitored from each subcompetition and a subcompetition outcome status of each contestant in the subcompetition is determined. At least some of the contestants are grouped according to at least one of the group criteria or subcompetition outcome status. The process continues there is a unique winner of the contest.

Alternatively, multiple users can compete in a skill-based contest by the following. A set of contestants distributed over the electronic network is identified. A competition task is electronically delivered to contestant electronic nodes. The contestant electronic nodes timestampe the receipt of the competition task, and deliver timing information to a server node in conjunction with contestant responses to the competition task. The server node analyzes the contestant responses and timing information and determining therefrom competition task successes and elapsed time of successes.

Alternatively, so that multiple users can compete in a skill-based contest by the following. A set of contestants distributed over the electronic network is identified. A competition task is multicast delivered to contestant electronic nodes substantially simultaneously, so that each contestant competes simultaneously with other contestants. Contestants respond to the competition task within a certain time established by contest rules and the certain time is enforced by a server node, for the server node to consider the contestant response as valid.

DETAILED DESCRIPTION

Figure 1:
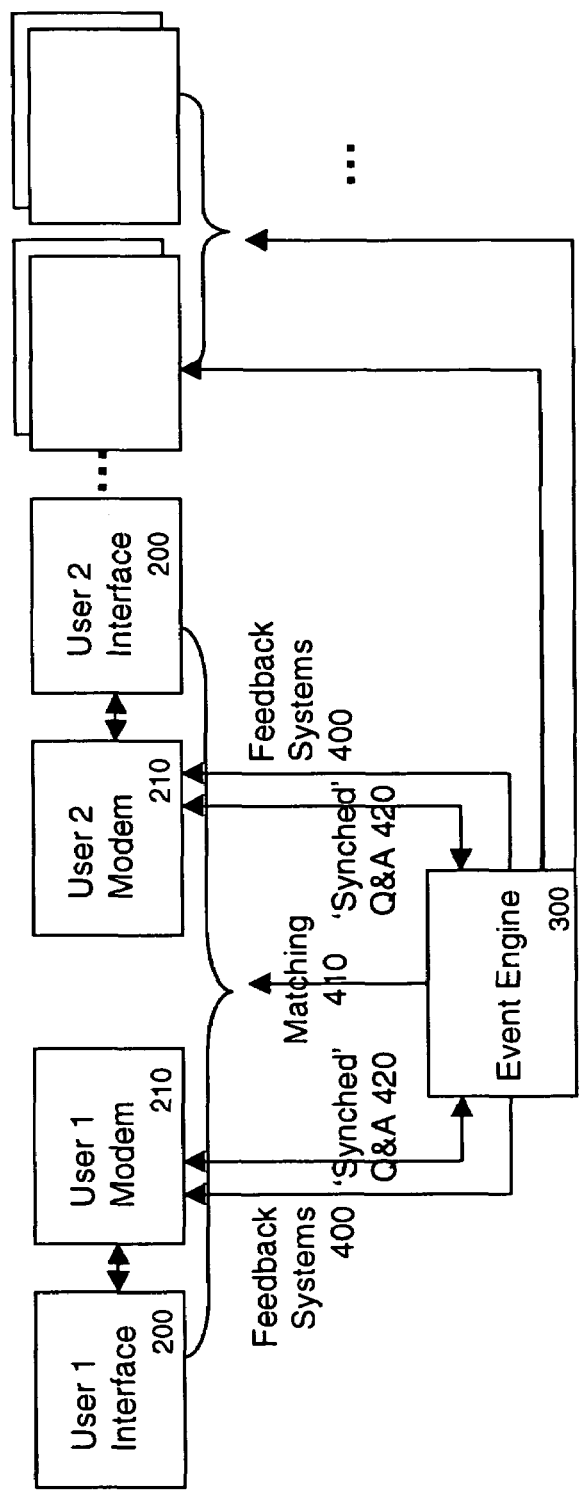
FIG. 1 shows a system architecture of a preferred embodiment.

Preferred embodiments provide four key components in some form of subcombinations:
1) it is widely available to the public,
2) it operates in real-time,
3) it is competitive and skill-based, and
4) it provides a significant financial reward.

Unlike any known competitions, a preferred embodiment allows millions of contestants to compete simultaneously. Moreover, the competition finishes in a fixed time, adding to the excitement of the game from the perspective of the contestants, viewers, advertisers, and sponsors.

Preferably, the registration process is not complicated or lengthy. This encourages participation in the contest.

The real-time component allows all participants to play simultaneously and watch the awarding of the prize to the winner within a short amount of time (e.g. one hour).

The embodiment is competitive and skill-based. This makes the competition attractive to contestants, viewers, advertisers, and sponsors. The selection of the winner is subject to a process that is fair, based on a participant's skill, and seeks to satisfy the participant's desire for competition.

The solution provides a significant financial reward to the winner, which attracts large-scale audiences and increases the excitement of the activity and the value of the game to contestants, viewers, advertisers, and sponsors. Under current advertising pricing models, a user's active participation on the internet is more valuable than passive participation.

An open, real-time, skill-based competition presents an inherent problem in its design: traditional methods of selecting a winner in skill-based competitions require an extreme amount of time. If the competition cannot be completed within a short amount of time, much of the value to viewers, advertisers, and sponsors is lost, and the number of contestants who would be willing to participated diminishes, which in turn again diminishes the value to viewers, advertisers, and sponsors. (More people are willing to play a one hour game than a ten hour game.)

The real-time, widely accessible, skill-based competition is differentiated in that potential competitors can all come together and play in the final competition because a selection process has been created which can select one winner from a pool of millions in a timely period (1 hour, for example).

Among its many desirable aspects, preferred embodiments are all believed to satisfy legal requirements for skill contests and sweepstakes.

Laws Pertaining to Skill Contests and Sweepstakes

Several federal agencies as well as every state have laws that prohibit contest sponsors from conducting a lottery. An illegal lottery involves the three elements of (1) awarding a prize; (2) which is determined by chance; and (3) to a person who has paid something of value to enter the contest. Thus, contests in which prizes are awarded on the basis of chance do not constitute illegal lotteries if entrants need not pay any money or purchase any product to enter or to win. So, if winners are chosen by a drawing, entrants must have an equal chance of winning whether or not they order a company product. Likewise, contests in which prizes are awarded on the basis of skill (as opposed to chance) do not constitute an illegal lottery even if entrants are required to pay money or to purchase a Company product.

Many states consider a contest a game of skill if the elements of skill predominate over chance in distributing prizes. Other states consider a contest a game of skill if there are no elements that can be considered chance. Accordingly, every game of skill should conform to the following criteria in order to ensure that it is, in fact, a game of skill: (1) Entrants should expend a reasonable standard of creative skill based upon the target audience; (2) Contestants should be advised of the standards of comparison that will be applied; (3) In selecting winners, the disclosed criteria of comparison must, in fact, determine the result; and (4) In the case of tying entries, a winner must not be determined by chance. For example, in case of a tie, duplicate prizes should be awarded, rather than given to the first entry to be received.

Overview of Exemplary System

The preferred embodiments of the present invention will now be discussed with reference to FIGS. 1, 2, and 3. In a preferred embodiment, the present invention includes Event Engine 300, User Interface 200 and associated databases and processors. The present invention allows multiple users to interact, using a one-on-one matching mechanism, and select a winner(s) and award a prize in a short, finite amount of time.

As shown in FIG. 1 preferred embodiments include User Interface 200 (with each contestant node having an instance of the user interface on the node) and an Event Engine 300 (collectively the 'Event-Client System', individually 'nodes'). The Event Engine is preferably a web-based server system that includes all of the game-specific logic for delivering questions and other information to contestants and processing answers and other responses from the contestants. It is also responsible for collecting and storing various forms of information discussed herein.

The User Interface 200 is a collection of game-specific user interface instances. (Only one User interface 200 is shown in the Figures for clarity.) Each client preferably includes client-side logic that presents content to the user, e.g., questions, and includes mechanisms and controls for the user to initiate the sending of answers and other information to the Event Engine 300. Each node is preferably connected via the Internet, for example, using a public switched phone network. Connection may also be provided by dedicated data lines, cellular, wireless, Personal Communication Systems ('PCS'), microwave, or satellite networks, or other forms of connectivity.

User Interface 200 is the input and output mechanism for communications with the Event Engine 300. An instance of the preferred User Interface includes a browser at a client for presenting contest registration information and contest questions, as well as other forms of information. One embodiment for example may include client-side applications for presenting content, e.g., downloadable logic. Other embodiments could include HTML and XML servers to present contents.

Figure 2:
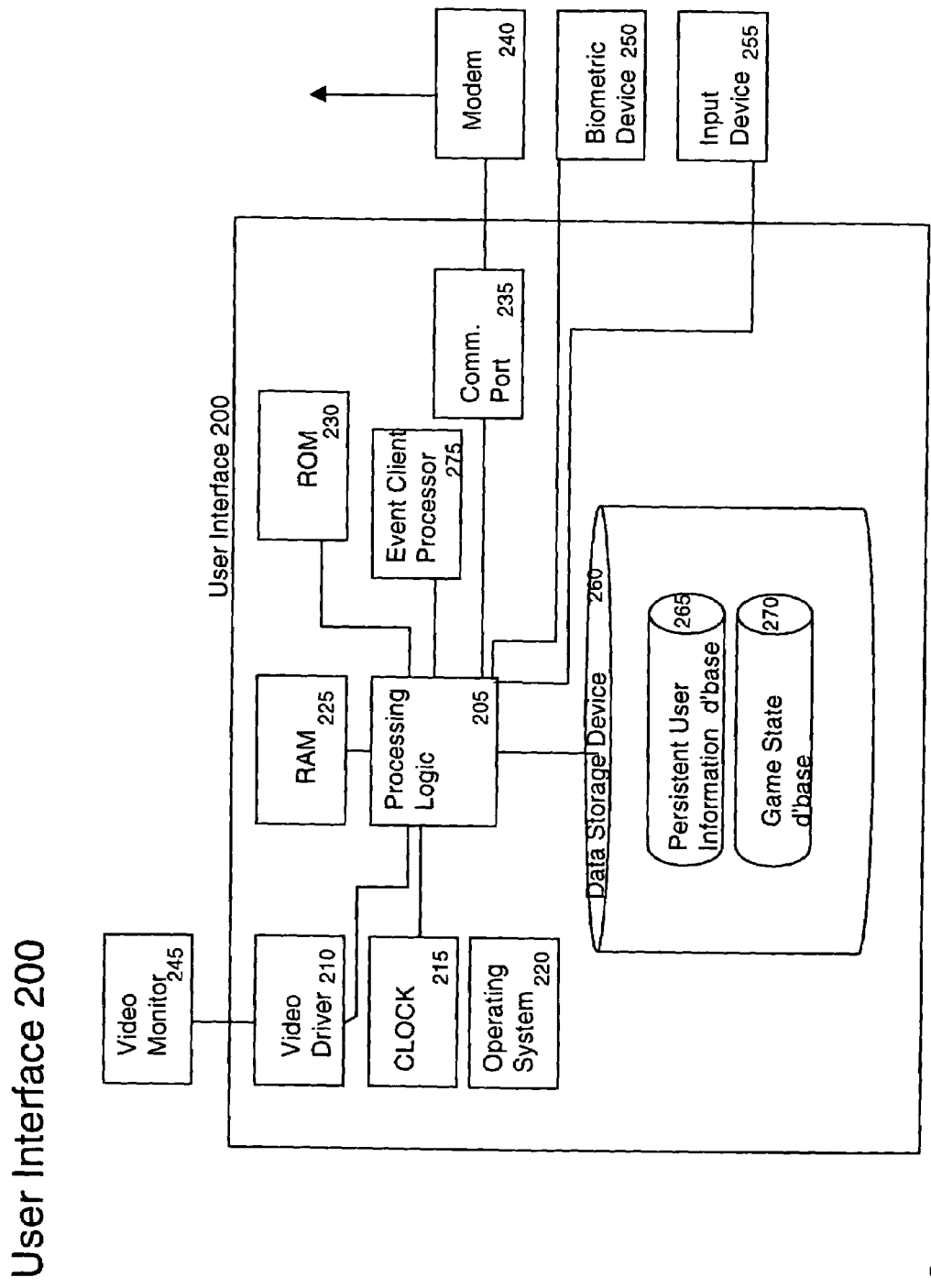
FIG. 2 shows a user interface of a preferred embodiment.

As shown in FIG. 2 the User Interface 200 includes a central processor (processor logic), a video driver 210 and display device 245, a data storage device 260, a communications interface capable of connecting to various communicating networks (e.g. the Internet), data input devices (keyboard, mouse, touch pad, etc.), RAM, ROM, an operating system, and the Event Client Processor. A conventional personal computer or any other network enabled computing device could be used for a User Interface 200. There are many devices other than personal computers that can serve as the User Interface. These might include 3COM's Palm Pilot VII, Sprint's PCS web enabled telephone and other Wireless Application Protocol devices. The Event Client 275 can be implemented on a single processor, or can be configured as part of processor logic 205. Event Client Processor 275 connects to an Event Engine 300 through the communications interface Modem 240, providing an interface to the event. Additionally, it maintains the local game status and uses the game logic to require the minimum transfer of information from the Event Engine 300. Data Storage Device 260 may be a combination of magnetic hard disk storage, and volatile RAM storage.

Persistent User Information Database 265 may be used to store certain information about the users' login and preferences to assist the user in entering this information. If the user is accessing the Event Client Processor 275 through a World Wide Web browser, this information could be stored in a cookie.

Game State Database 270 may be used to store local information relevant to the state of the game. This information may be stored in local temporary storage allocated to Event Client Processor 275, most likely RAM. By using this local storage, Event Client Processor 275 greatly reduces the amount of data sent back and forth to Event Engine 300 to participate in the event. In other embodiments, these various sections can be omitted or rearranged or adapted in various ways.

The event client processing logic 275 under one embodiment is implemented as downloadable logic, which for example is downloaded at contest registration. This logic, for example, includes Java Abstract Windowing Kit to provide user controls and to format user interface information, e.g., format questions presented to the user.

One embodiment implements the User Interface databases by using cookies to implement persistent user information 265, and local storage for game state 270.

Event Engine 300 is preferably capable of high volume transactions processing, performing a significant number of mathematical calculations in processing communications and database interactions. The transaction processing includes the logic to receive and process of user-supplied information (e.g., answers to questions) and to update the server-side database information accordingly. In one preferred embodiment, the Event Engine communicates with the User Interfaces with UDP-based protocols (with reliability added). The event engine is also responsible for monitoring winners and loser and balancing the contest tree.

Figure 3:
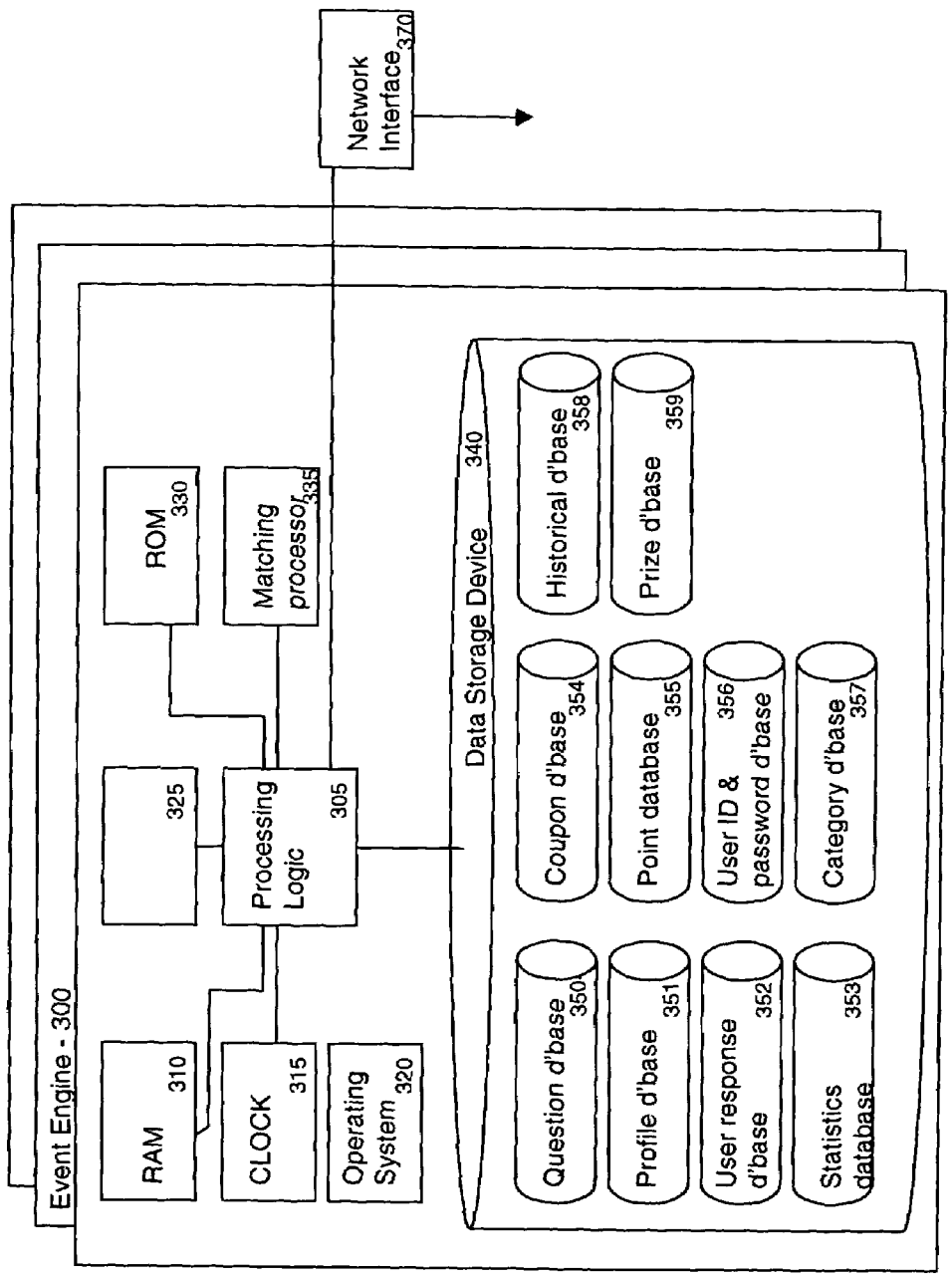
FIG. 3 shows an event engine of a preferred embodiment.

As shown in FIG. 3, the Event Engine 300 includes processor logic, an operating system, a clock, RAM, ROM, a network communications interface, a data storage device, and a matching/game engine processor. A conventional personal computer or computer server with sufficient memory and processing capability may be used as an Event Engine. In the preferred embodiment, it operates as a web server, processing requests for data used to facilitate the event client's participation in the event. A Pentium microprocessor such as the 550 MHz Xeon manufactured by Intel may be used for the processor logic 305. Equivalent processors include the Sun Microsystems' 600 MHz UltraSPARC II, and the 400 MHz Motorola PowerPC 750. Those skilled in the art realize that the type number can be exchanged.

The Event engine includes a matching processor 335 that can be implemented with one or more conventional processors, supporting the matching of participating users as well as the transmission and reception of user data. Matching processor 335 can also be configured to be part of processor logic 305. The matching processor 335 manages the user matching and user performance with custom software. Serving the content to the clients may be done with commercial web server software such as Microsoft's Internet Information Server.

Data Storage Device 340 may include magnetic hard disk storage as well as optical storage, or solid-state flash memory. The Data Storage Device 340 contains databases used to store both user and game information, collected both during game times and non-game times. The invention contains Question Database 350, Profile and Preference Database 351, User Audit Trail Database 352, Statistics Database 353, Coupon Database 354, Point Database 355, User ID and Password Database 356, User Preferences Database 357, Category Database 358, Historical Database 359, and Prizes Database 360.

Question Database 350 contains all the questions used in the game. They are sorted by category and difficulty. Each question may include references to the sources and an audit trail. (Among other things, information for keeping track of the history of the question, e.g., who authored, who authorized, when was it served, etc.)

The preferred embodiment allows for the creation of a user profile database 351 which tracks answers to questions, responses to advertising offers, categories selected and other information collected from user interaction with the site. This may include data entered by the user, settings made by the user, and actions taken by the user. This information is stored in the Profile and Preference Database 351.

Statistics Database 353 contains compiled statistics from previously played games. These statistics may include compiled user information, game performance data, and user demographic data.

Coupon Database 354 contains all coupon information and usage for electronic coupons. An example of a coupon is a discount for a consumer product that is awarded based on the answer(s) of the user. The Database may include the merchant where the coupon can be validated and the product information that the coupon refers to. Under preferred embodiments, the electronic coupons include "click on" coupons as opposed to "click through" and thus the user won't hyperlink to a coupon site.

Participants can be awarded points for correct answers and other responses and events. These points may be redeemable or exchangeable for rewards or other prizes. Point Database 355 contains a record of all the points accumulated by each user. The database may contain an interface by which the points can be exchanged for other types of points (e.g. GreenPoints, or frequent flier miles).

User ID and password database 356 maintains a record of all usernames and passwords. This will be referenced when the user logs into the site, and used to validate the users identity.

The preferred embodiment utilizes question categories too add value to the user profile database and to permit the use of category-specific advertising including questions sponsored by a company related to the category (e.g. a sporting goods company advertising to the participants in the sports category). Category Database 358 contains a listing of all available categories. This may contain usage information and links to questions available in those categories.

Historical Database 359 may include any and all data collected during any or all of the game events. This data may be used for legal action in the case where a participant's winning status is in question. It may also be used to compile game and/or user statistics and/or preferences. This data may be archived for a permanent or long term record of the game events.

Prizes Database 360 may contain records of all prizes that can be won either by a participant accumulating a certain number of "points" or being determined a "prize winner" in some other fashion. This database may be maintained internally to this invention, or by a third party. This database may exist in multiple instances, maintained by multiple parties.

In other embodiments, these databases could be merged, broken apart, added to or subtracted from the configuration as to adapt to different game configurations. They may or may not reside on the same machine, and may or may not reside in similar formats. Some databases may reside in a large-scale commercial product such as Microsoft's SQL server package, or Oracle's Version 8 database product or future versions of these or similar products. Others may reside in simple text-based log files, or custom binary files. Others may also be pieces or "tables" in other databases in any of the above formats. In other embodiments, Event Engine 300 could be scaled to reside on multiple machines to increase its capacity. Also, these machines could be widely distributed, but still maintain communication with each other and act like a single engine. This distribution would act to minimize network latency when communicating with the Event Client Processor 275, and would allow real time interaction with massive amounts of participants.

The Event Engine 300 allows large numbers of players to participate in a real-time, interactive game environment versus other players. The player logs on to the Event Engine 300, is matched against an opponent, and proceeds to answer a series of questions. The questions are synchronized so that each participant is sent a question at the same time.

Synchronization occurs at multiple levels. At a first level, a group of participants receives a broadcast (effectively a multicast to the particular group within the set of contestants) of the question. The Event Engine includes a time window in which people can answer. This answer window is large enough to accommodate the contestant's time limit (e.g., ten seconds) plus internet delays and jitter.

The answers are also synchronized under one embodiment, so that each participant is sent the correct answer at the same time. In other embodiments, questions and answers could be sent at staggered intervals.

At the client-side, when the question arrives the event client processor logic 275 time-stamps the question and allows the user to answer in finite time (e.g., ten seconds)

The Event Engine 300 processes the synched questions, records the results in the Data Storage Device 340, and sends a response to the players. In a preferred embodiment, the players move down a contest tree until only one player remains in the winner track, thus winning the cash prize. The contest tree starts out with all the participants in the winner track and reduces the number of players in the winner track by approximately one-half each round. The Event Engine 300 maintains the synchronization, matches players within the tree, provides feedback based on performance to contestants, and stores the information.

One embodiment groups the contestants into a set of one-on-one subcompetitions or rounds. Winning contestants then proceed across a winners' bracket until an ultimate winner is determined. Alternatively, the competition may include a loser's bracket or brackets extending the contest beyond single elimination, according to predetermined bracketing formulas, e.g., winner of losers bracket must beat winner of winner's bracket 2 out of 3 subcompetitions in the competition's final round.

To allow users to participate in one-on-one (i.e. head-to-head) competition, each participant is matched with either another participant or a "simulated" participant for one round. The use of a simulated participant allows more participants to the contest in that the competition need not be limited to a number of contestants equal to a power of 2. It also stabilizes the organization and format of the game (i.e., the contest tree) in case a contestant leaves the game, for example.

Participants can be matched based on many criteria. For example, preferred embodiments match participants based on performance (e.g., did they win the prior round; or historic performance from other competitions), geographic region or subject matter category for a given round of the contest.

For example, in a one-on-one, single elimination tournament, the matched participants compete against each other, and only the winner of each match-up advances to the next round of that performance bracket (e.g. winner track, one-loss track, two-losses track, etc.). In the next round, the winner will be matched with another winner of a prior round.

Figure 4:
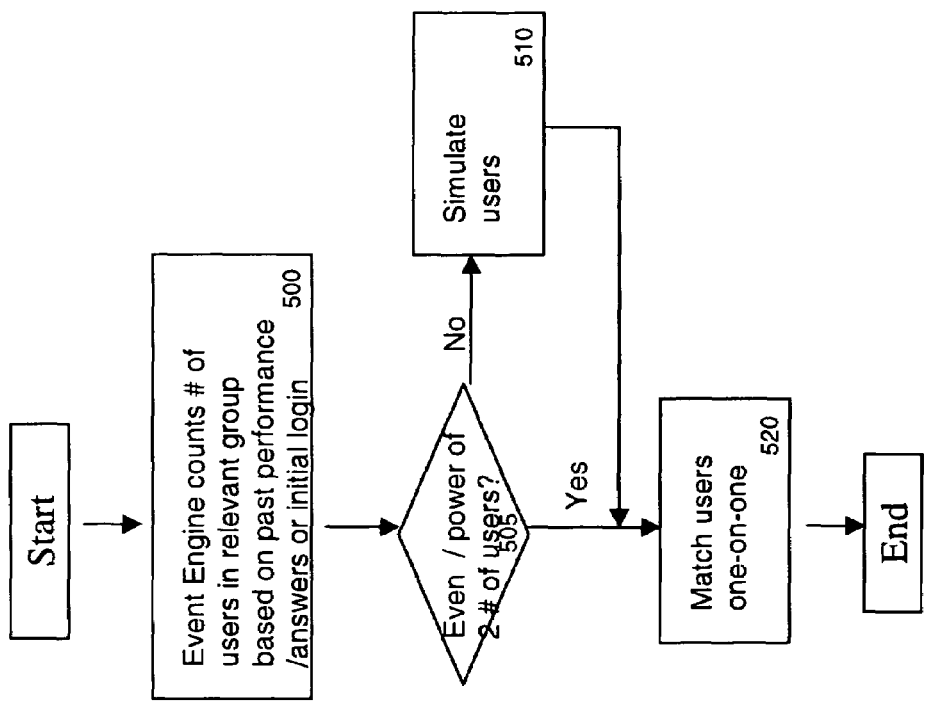
FIG. 4 is a flowchart of matching logic of a preferred embodiment.

FIG. 4 describes the process in which the Event Engine 300 matches players against one another. At step 500, the Event Engine 300 counts the number of users in the relevant group. The initial count may be the result of a registration process in which, for example, the public-at-large is invited to participate in the contest. For example, a web site associated with the contest can announce the contest and register contestants in advance of the actual contest. Registration may provide log-in rights and may download client side user interface logic as discussed above. The login process may include separate logic to limit the number of users to guarantee performance; for example, to limit the contest to four million contestants if ten million contestants register.

In a preferred embodiment implementing a single elimination format of contest, after initial log-in, for example, the users will be in the main bracket tree, but could be within various category groups. These categories could include Sports, News & History, Arts & Entertainment, or Science and Technology.

Under one embodiment, contestants choose their initial category. An eventual winner of that category is then placed in a generalist pool, in which the contestants in that pool/category may be asked questions selected from multiple categories.

Other embodiments may force assignment into categories, choose a contestants group randomly, or determine a category based on other information (e.g., the contestant's address).

After a series of matches, a group of players will remain in the main track while others will compete in other brackets based upon performance. The Event Engine includes tracking logic (not shown) for monitoring the contest status, e.g., which users remain in which categories and brackets.

The Event Engine 300 is able to differentiate and track each relevant group simultaneously. (Among other things, this tracking facilitates displaying the progress of the game for contest viewers.) In step 505, the Event Engine determines whether the number of players in the relevant group is an even number and/or a power of 2. As shown in step 520, if the number of players is even and/or a power of 2, the Event Engine 300 will match the users for one-on-one competition. If the number of players is not even and/or a power of 2, the Event Engine 300 will simulate users, as shown in step 510. The users will be simulated in order to ensure that every individual is matched. In other words, the Event Engine 300 will always match the users against an opponent, even if the simulation of a user is required. This simulation will ensure the stabilization of the contest tree.

Simulated users provide flexibility in stabilizing the tree. Users may be simulated, for example, so that the initial set of contestants, "real" and "simulated," is a power of two, ensuring that each real user faces the same number of rounds. Other strategies would grant "bye" rounds to users to balance a tree. For example, a bye may be granted randomly, or it may be granted based on performance (e.g., a contestant with better performance may receive a bye).

There are several ways to match individuals and ways that could be used to stabilize the tree; an example is to provide a user with a bye instead of simulating users as in step 510 in the case of an uneven number of players. In step 520 the Event Engine matches the users one-on-one.

The winner of a match-up can be determined in several ways, depending upon the game. In a preferred embodiment, the two opponents answer a predetermined number of multiple choice questions, and the participant with the highest number of correct answers advances. If both participants in a match-up answer the same numbers of questions correctly, a participant will advance if they answer a final question correctly in less time than their opponent. Naturally, the questions need not be multiple choice, and in these cases the logic for determining the most number of correct answers needs to be adjusted accordingly. For example, contestants may be asked to guess the cost of an item, and the person with the closest number may be determined to have a "correct" answer.

Figure 5:
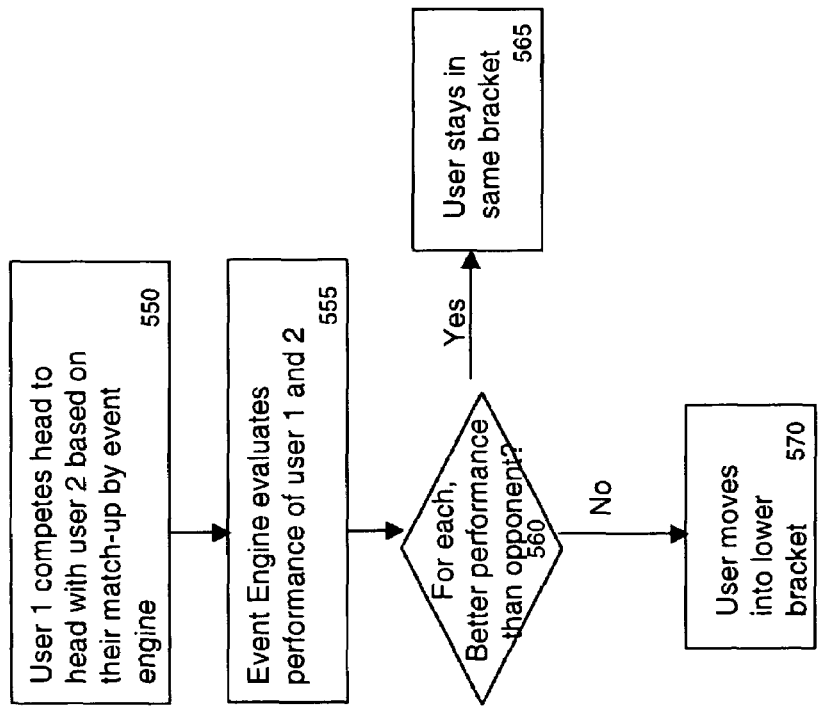
FIG. 5 is a flowchart of competition logic of a preferred embodiment.

As described in FIG. 5, in this embodiment, the players compete one-to-one and the Event Engine 300 evaluates the performance. Based upon this performance, the Event Engine 300 will move the players into the appropriate bracket. By moving to another bracket, the databases will be updated to track the contestants' progress and also to effect the subject matter content delivered to the users. For example, questions may get more difficult in subsequent rounds. Alternatively, if a contestant is switched to a different category (e.g., because of a game-specific rule on the number of questions permissible in a given category), the subject matter will differ.

At step 550, the matched users compete one-to-one. In the preferred embodiment, this competition entails the answering of a series of multiple-choice questions, described in detail in FIG. 7. After each question, the Event Engine 300 compares and records the performance of each player, for example, recording both correctness and timing. There are several alternative ways to evaluate performance. In the preferred embodiment, the Event Engine 300 tracks the cumulative performance of players in one round.

One round consists of three multiple-choice questions, and in case of a tie, a timed multiple-choice question. As shown in step 555, the Event Engine evaluates the cumulative result of each player in one round. In the preferred embodiment, the better performance is defined as who answered the most questions correctly, and in case of a tie, which contestant answered the last question the fastest. The client-side logic timestamps questions and responses to measure the cumulative time at the client and thus may be used to fairly measure a contestant's quickness and ignore networking delays.

In step 560 the Event Engine 300 compares the performance of the contestants and matches based on pre-established criteria, such as the contestant's performance. If the user has performed better than the opponent the user stays in the bracket (step 565).

In step 570 the user moves into a different bracket, e.g., a one-lose bracket, two-less bracket, etc. The matching is then again performed on the new brackets, and the contestants again compete. Under a preferred embodiment, there are a sufficient number of brackets to allow all contestants to remain in the contest at a respective bracket; e.g., there may be multiple loss brackets.

Figure 6:
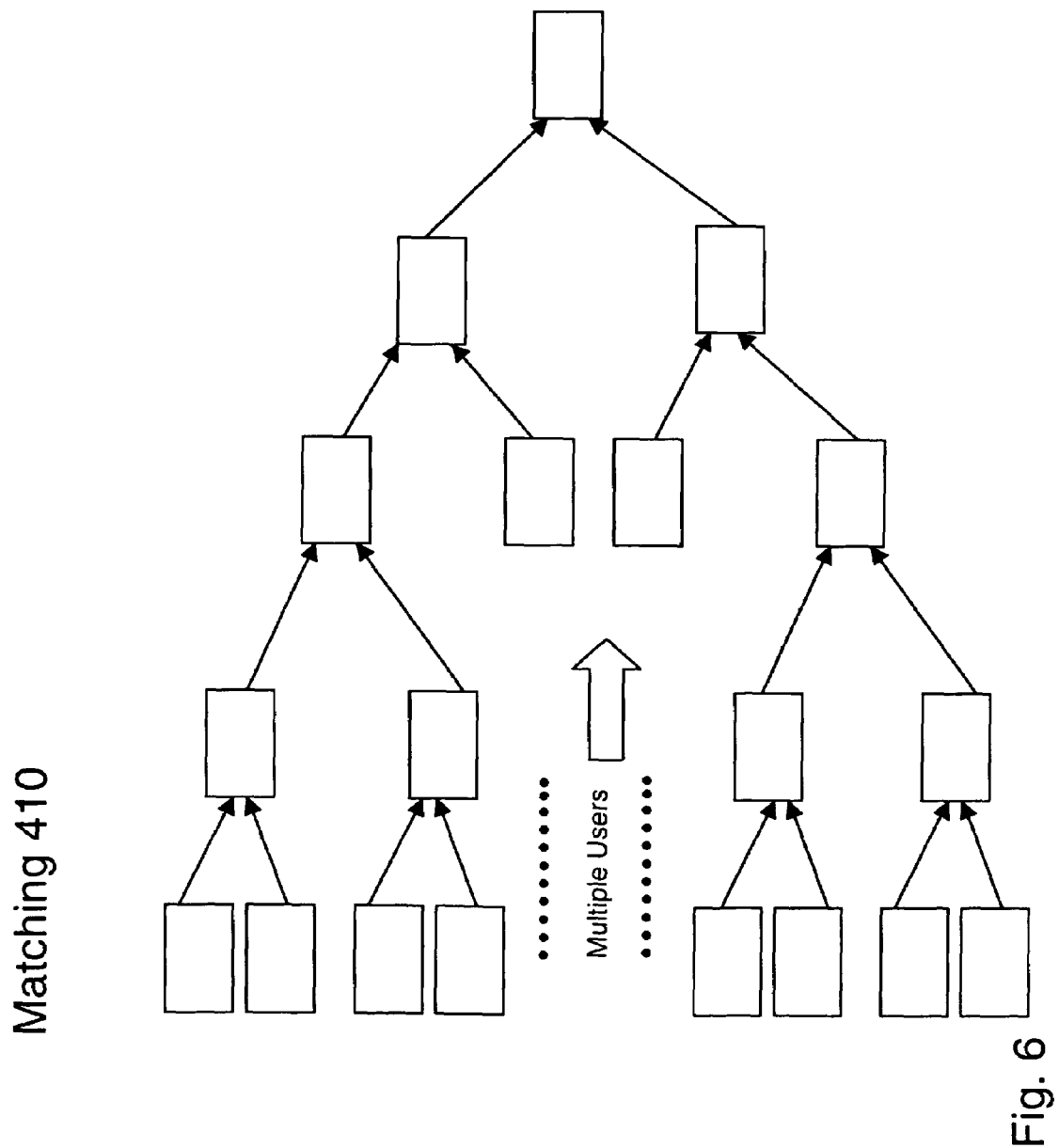
FIG. 6 shows a competition tree for modeling a competition according to a preferred embodiment.

FIG. 6 describes the contest tree that the Event Engine 300 uses to select a winner. In some embodiments the contest tree is forced to be logarithmic with simulated users at an initial phase, or at other stages.

Figure 7:
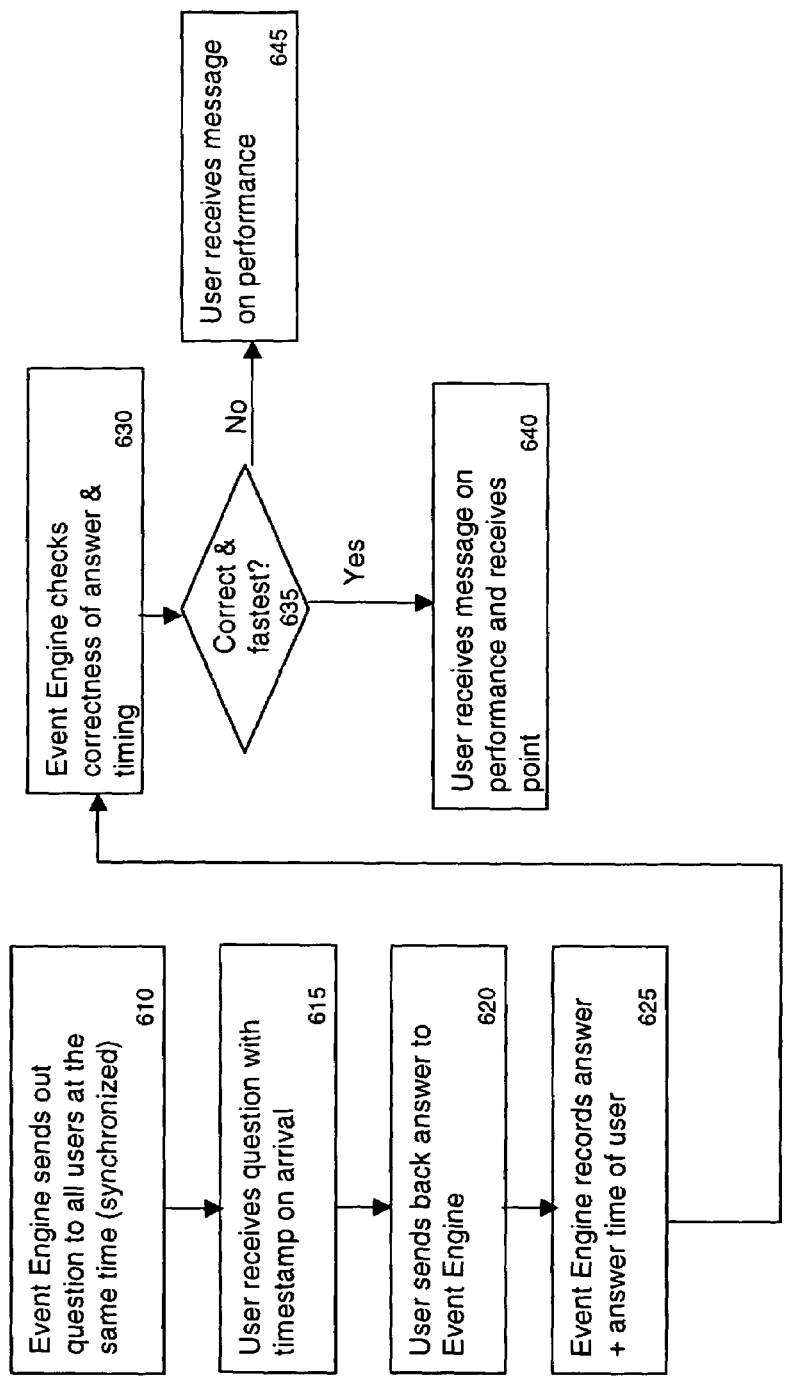
FIG. 7 is a flowchart of question and answer logic of a preferred embodiment.

FIG. 7 describes the synched question and answer sequence, which the Event Engine 300 controls. In step 610 the Event Engine sends the questions to the players simultaneously through effective multicasting, described above. The use of UDP provides an efficient mechanism for this content delivery. The user receives the questions, and the question is timestamped at the client-side with a timestamp attached in step 615. The information (packet) is received by the User Modem 210, which then communicates to the User Interface 200. The User Interface 200 will display the information using the Event client processor 275, which in the preferred embodiment contains a question, and four multiple-choice answers. The timestamp will allow the Event Engine 300 to trace the timing of the player as the question is answered. The timestamp feature allows the Event Engine 300 to evaluate players regardless of any connection factors. The players will be given a finite timeframe to answer the question, again to ensure synchronization at the server side so it knows when to send the next. At step 620, the player will send back the answer to the Event Engine 300.

In a preferred embodiment in which one question has four multiple-choice answers, the user will click on one of the four answers to indicate the response, e.g., through a UI control. The response from the user could be sent at any point within the finite timeframe. Thus, the Event Engine 300 will receive "waves" of multicast (or broadcast) packets containing the answers.

At step 625 the Event Engine records the answer and the timestamp attached to the answer in the Data Storage Device 340. This storage will allow the Event Engine 300 to track the history of the player, which will be essential for evaluating performance, matching opponents, and sending feedback.

In step 630 the Event Engine 300 checks the answer for both correctness and time. The Engine will compare the answer the player sends with the correct answer stored in the Question Database 350. The Event Engine will also compare the opponents' timing versus one another.

In step 635, the Event Engine 300 performs this evaluation of the relative performance.

Figure 9:
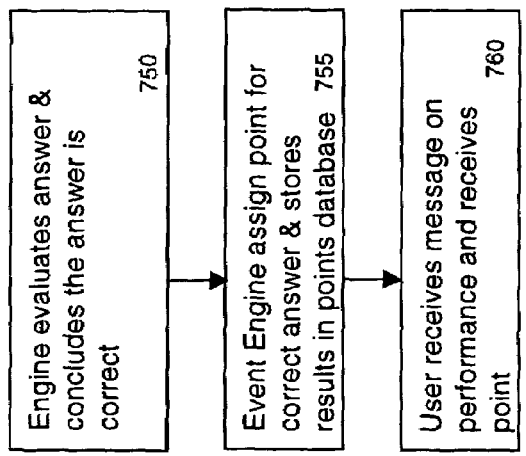
FIG. 9 is a flowchart of feedback logic of a preferred embodiment.

In step 640, if the answer is correct and the timing is faster than the opponent, the Engine will deliver a message to the user and award the user one point (described in detail in FIG. 9). If, however, the evaluation of the player by the Engine determines the answer was not correct, the user will simply receive a message as in step 645. Players could still be assigned points for a correct answer even if they didn't answer the fastest.

Figure 8:
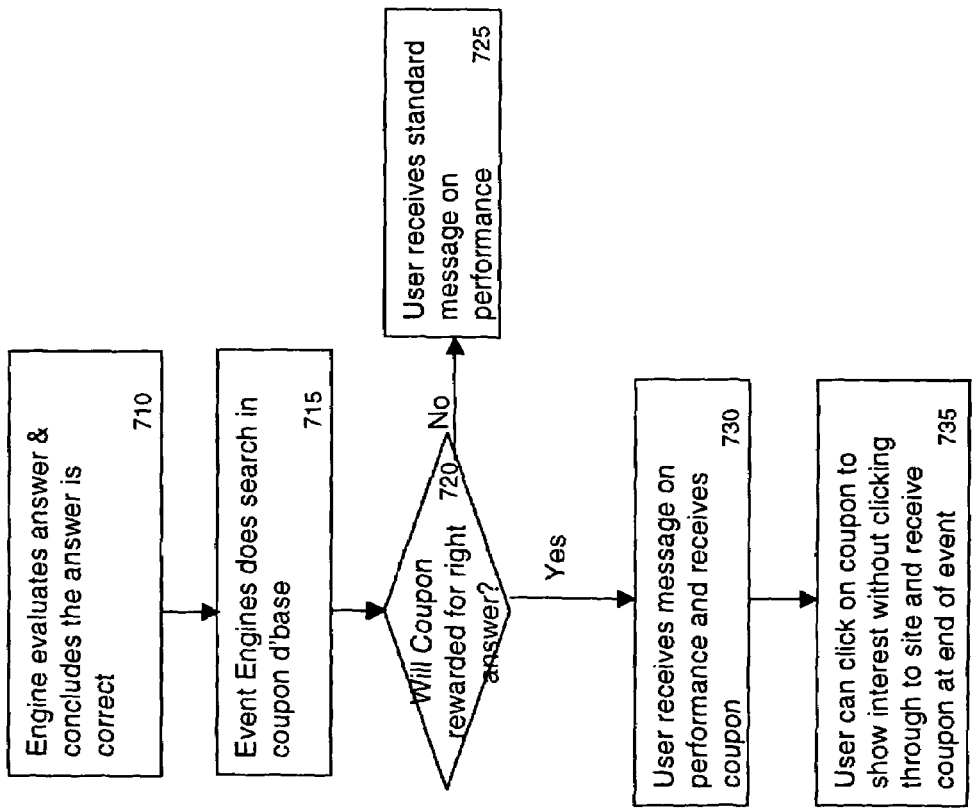
FIG. 8 is a flowchart of feedback logic of a preferred embodiment.

FIG. 8 describes the feedback process for the Event Engine 300 related to rewarding the players with coupons. In step 710, the Event Engine 300 evaluates the player's answer to determine correctness. If the Engine determines the answer is correct, it conducts a search within the Coupon Database 354, step 715. The Coupon Database 354 contains a number of coupons and the corresponding questions for which they will be awarded in case of a correct answer. Based on this database, the Engine will determine, in step 720, whether a coupon will be awarded for a correct answer.

In step 725, if the coupon will not be awarded, the user will receive a standard message evaluating the performance. In step 730, it has been determined that a coupon will be awarded for a correct answer, thus the user receives a message as well as a coupon. This coupon, as shown in step 740, is a 'click-on' coupon, rather than a 'click-through' coupon. Therefore, the player will have the ability to click on the coupon to receive it automatically after the game, yet continue to play the game. There are several ways to provide the user with the continuity of the experience without actually being redirected to another site/URL. The coupons each player has clicked-on or has been awarded will be stored in the Event Engine 300, and the player will, for example, be able to view a summary at the conclusion of the game or within their personal statistics section.

FIG. 9 describes the feedback process for the Event Engine 300 related to rewarding the players with points for correct answers. In step 750, the Event Engine 300 evaluates the player's answer to determine correctness. If the question is correct, the Engine will assign a point to the player. In step 755, this point is stored in the Points Database 355. In step 760, the Event Engine 300 will deliver a message to the user along with a point. The Engine is able to track each user's point total within the Points Database 355. Points might be rewarded for other elements such as speed of the answer, the cumulative performance in rounds, etc.

Figure 10:
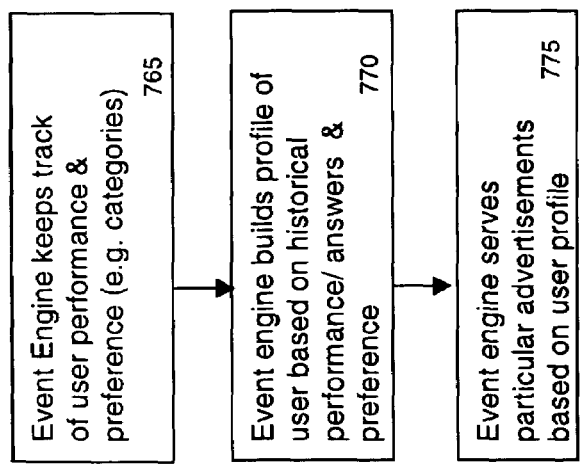
FIG. 10 is a flowchart of feedback logic.

FIG. 10 shows the ability of the Event Engine to serve information and advertisement based on the user profile that is build up by the Event Engine based on past performance and preference (e.g. chosen categories in the past). In step 765 the Event Engine records the user answers & chosen categories every time the users interact with the Event Engine. In step 770 the Event Engine builds the profile of the user by putting together the collected user performance and preferences. In step 775 the Event Engine serves advertisement/information to the user based on the profile that is created in step 770.

An example in the preferred embodiment is the serving of an advertisement for a book related to the history of soccer given the fact that the user answered the majority of the soccer questions right. The Event Engine might, based on these right answers, conclude that the user is interested in this particular area of sports and therefore serve specific information related to this profile.

The Event Engine further has the ability to serve 'branded' questions. These questions incorporate information about brands (e.g. consumer brands such as apparel companies) that might be sponsored by these (consumer) brand companies. An example of a question that is part of the preferred embodiment is: "To how many countries does this 'Airline X' fly?."

Figure 11:
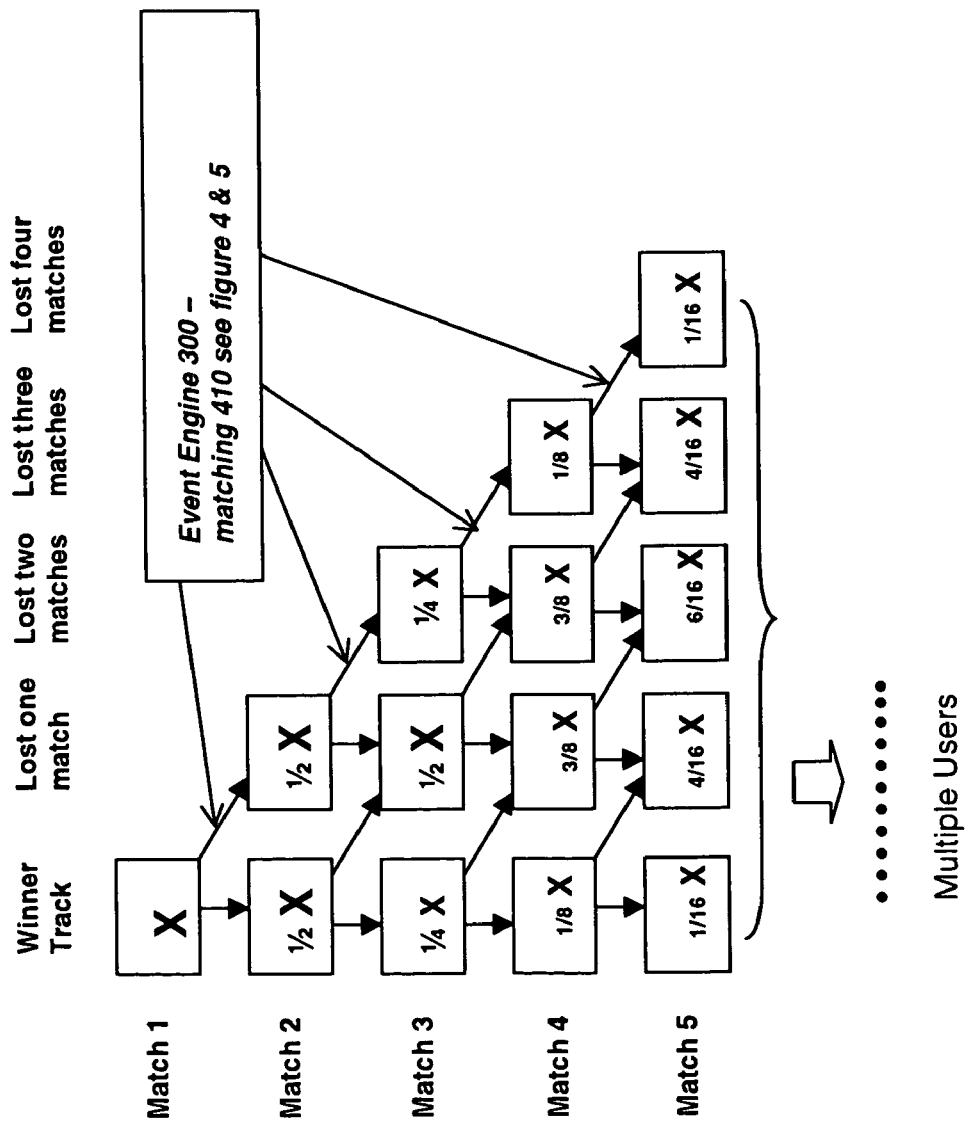
FIG. 11 shows a variant of matching logic of a preferred embodiment.

FIG. 11 is an overview of how the Event Engine 300 matches opponents based on their performance. The players within the winner track continue down this path as they continue to win matches by beating their opponents. The Event Engine 300 will match each player after each former match. For example, after match 1, there will be one-half of the players within the winner track, and the other half in the bracket—'one match lost'. These players are matched within these groups. The Engine is able to match the players based upon the total number of matches lost. This will allow for players of similar caliber to compete. As the number of matches increases, the winner track is narrowed, while the other brackets grow.

In another embodiment, contestants could simultaneously answer questions receiving varying amounts of points depending on the answer and time taken to answer the question. The player with the most points could be determined the winner. In another embodiment the questions could be open-ended/not multiple-choice, pictures, clues etc.

Preferred embodiments have competitions and subcompetitions premised on quizzes such as multiple choice questions. Other competitions may be based on other skill-based games. The term "skill-based" means that a winner of a competition or subcompetition is not determined by chance but by user response.

The subcompetitions all involve competition tasks. In the quiz example, the task is to answer the question correctly. In other examples, this may include responding to some skill-based game such as moving a chess piece, etc.

Preferred embodiment can record user responses to create user profiles, which may be valuable advertising information; e.g., indicating a particular user's preferences and interests, such as sports or history.

Other embodiments can record user responses to create demographic profiles, which may be valuable advertising information. Demographic information includes information, such as (but not limited to) age, gender, residence, type of client (wireless or wire-based), types of browser and other technology etc. (This for example may be determined automatically or through registration.)

Other embodiments can record user responses to create psychographic profiles by analyzing various user responses according to a pscyhographic model.

Demographic and pscyhographic profiles may be created to preserve user anonymity.

Competition tasks may include "branded questions," e.g., how many countries does a particular airline fly to. This information may be valuable to both the particular airline or its competitors. These answers fall into the category of user responses.

Branded questions provide value not only by the responses but by providing a more active manner of advertisement. The user is actively responding to the branded question and thus creating a firmer impression than passive advertising.

Preferred embodiments award a user points for winning a subcompetition or task. For example, this may be by winning one question within a multiple question subcompetition, or it may be by winning the subcompetition itself. These user points in turn may be redeemed for prizes, including (but not limited to) prizes provided by sponsors and/or advertisers.

Certain embodiments allow the user to choose a category at least for some subcompetitions. This choices for example may indicate a preference or interest and is considered a user response that may be included in the various forms of profile information, e.g., user profile, demographic profile, etc.

Alternative embodiments can use a unique coding scheme (e.g., prime numbers etc.) in which a cumulative total of points or some other determative function (e.g., signatures) uniquely indicate the particular questions answered correctly. In this fashion, correctness may be determined remotely at the client or at the server.

Those skilled in the art will recognize that the method and apparatus of the present invention has many applications, and that the present invention is not limited to the representative examples disclosed herein. Moreover, the scope of the present invention covers conventionally known variations and modifications to the system components described herein:

We claim:

1. A method of using a communication network so that a large multitude of users may simultaneously compete in a skill-based contest as contestants, comprising:
   a. identifying a large multitude of contestants;
   b. grouping the contestants into group subsets according to group criteria;
   c. matching contestants within the group subsets into subcompetitions;
   d. for each subcompetition, presenting a competition task over the communication network to the contestants of the subcompetitions;
   e. monitoring responses to the competition task from each subcompetition and determining a subcompetition outcome status of each contestant in the subcompetition;
   f. grouping at least some of the contestants according to at least one of the group criteria or subcompetition outcome status;
   g. repeating acts (c)–(f) until there is a unique winner of the contest wherein the contest begins for all contestants at a fixed start time and converges to the unique winner in a fixed, short amount of time after the fixed start time.

2. The method of claim 1 wherein the subcompetition outcome status includes at least the states win, lose, and tie.

3. The method of claim 1 wherein the subcompetition tasks are presented in act (d) substantially simultaneously.

4. The method of claim 1 wherein the competition task is delivered from a server node to contestant electronic nodes and wherein the method further comprises
   contestant nodes timestamping the receipt of the competition task, and delivering timing information to a server node in conjunction with contestant responses to the competition task;
   the server node analyzing the contestant responses and timing information and determining therefrom competition task successes and elapsed time of successes so that the server node may determine the quickness of contestants independently of the performance of the communication network relative to the contestant nodes.

5. The method of claim 4 wherein the competition tasks are presented substantially simultaneously.

6. The method of claim 5 wherein the server node enforces a time deadline for the receipt of response.

7. The method of claim 1 wherein contestants respond to the competition task within a certain time established by contest rules and enforced by a server node, for the server node to consider the contestant response as valid.

8. The method of claim 1 wherein contestants respond to the competition task within a certain time established by contest rules and enforced by a server node, for the server node to consider the contestant response as valid and wherein contestant response information is recorded to create contestant profile information.

9. The method of claim 1 wherein contestants respond to the competition task within a certain time established by contest rules and enforced by a server node, for the server node to consider the contestant response as valid and wherein contestant response information is recorded to compile demographic information.

10. The method of claim 1 wherein contestants respond to the competition task within a certain time established by contest rules and enforced by a server node, for the server node to consider the contestant response as valid and wherein contestant response information is recorded to compile demographic information.

11. The method of claim 1 wherein contestants respond to the competition task within a certain time established by contest rules and enforced by a server node, for the server node to consider the contestant response as valid and wherein contestant response information is recorded to compile psychographic information.

12. The method of claim 1 wherein contestants respond to the competition task within a certain time established by contest rules and enforced by a server node, for the server node to consider the contestant response as valid and wherein prizes are awarded to contestants.

13. The method of claim 1 wherein contestants respond to the competition task within a certain time established by contest rules and enforced by a server node, for the server node to consider the contestant response as valid and wherein prizes are awarded to contestants and wherein the prizes include click-on electronic coupons.

14. The method of claim 1 wherein contestants respond to the competition task within a certain time established by contest rules and enforced by a server node, for the server node to consider the contestant response as valid and wherein prizes are awarded to contestants and wherein the prizes include click-on electronic coupons and wherein user activation of a click-on electronic coupon is user response information.

15. The method of claim 1 wherein contestants respond to the competition task within a certain time established by contest rules and enforced by a server node, for the server node to consider the contestant response as valid and wherein the competition tasks include branded questions.

16. The method of claim 1 wherein contestants respond to the competition task within a certain time established by contest rules and enforced by a server node, for the server node to consider the contestant response as valid and wherein the contests awards points to users based upon their responses, and these points are redeemable for prizes.

17. A method of using a communication network so that a large multitude of users may simultaneously compete in a skill-based contest as contestants, comprising:
   a. presenting competition tasks to contestants;
   b. collecting responses to the competition tasks from the contestants;
   c. analyze the responses to create user profile information about user preference, interests, or contestant competition task performance.

18. A method of using a communication network so that a large multitude of users may simultaneously compete in a skill-based contest as contestants, comprising:
   a. presenting competition tasks to contestants;
   b. analyzing contestant responses;
   c. creating a unique signature for each contestant indicative of at least some of the contestant's response.

* * * * *

UNITED STATES PATENT AND TRADEMARK OFFICE
CERTIFICATE OF CORRECTION

PATENT NO. : 7,076,434 B1  Page 1 of 1
APPLICATION NO. : 09/536518
DATED : July 11, 2006
INVENTOR(S) : Newnam et al.

It is certified that error appears in the above-identified patent and that said Letters Patent is hereby corrected as shown below:

In Column 2, Line 32, delete "UltimaOnline (.UltimalOnline.com)" and insert -- UltimalOnline --, therefor.

In Column 2, Lines 49-50, delete "(.station.sony.com)".

Signed and Sealed this

Thirtieth Day of December, 2008

JON W. DUDAS
*Director of the United States Patent and Trademark Office*